US005885115A

United States Patent [19]

Stillie

[11] Patent Number: 5,885,115

[45] Date of Patent: Mar. 23, 1999

[54] FORMED ROUND PIN

[75] Inventor: Donald Gray Stillie, Winston-Salem, N.C.

[73] Assignee: The Whitaker Corporation, Wilmington, Del.

[21] Appl. No.: 910,377

[22] Filed: Aug. 13, 1997

Related U.S. Application Data

[60] Provisional application No. 60/027,035 Sep. 26, 1996.

[51] Int. Cl.$^{6}$ .................................................. H02R 13/514

[52] U.S. Cl. ........................................ 439/752.5; 439/947

[58] Field of Search ................................ 439/78, 83, 63, 439/876, 752.5; 174/207

[56] References Cited

U.S. PATENT DOCUMENTS

| | | | |
|---|---|---|---|
| 3,634,813 | 1/1972 | Baumanis | 339/156 R |
| 3,697,926 | 10/1972 | Krafthefer | 339/17 L |
| 4,332,430 | 6/1982 | Clark | 339/17 C |
| 4,448,477 | 5/1984 | Gladd et al. | 339/258 RR |
| 4,743,205 | 5/1988 | Mitani et al. | 439/78 |
| 4,846,719 | 7/1989 | Iwashita | 439/63 |
| 4,895,530 | 1/1990 | Gugelmeyer et al. | 439/311 |
| 4,946,392 | 8/1990 | Kobler et al. | 439/78 |
| 5,431,587 | 7/1995 | Matsuoka | 439/733.1 |
| 5,624,269 | 4/1997 | Kanamori | 439/83 |

*Primary Examiner*—Neil Abrams
*Assistant Examiner*—T C Patel

[57] ABSTRACT

The invention comprises a pin contact having a main body with a top contact section, two side edges, and a bottom surface. The two side edges being juxtaposed to form a seam. Solder tails extend from the bottom surface of the main body to be received through holes. An orientation member is formed along the main body and along the seam. The orientation member provides the proper orientation to the main body so that the solder tails are properly aligned with the holes.

6 Claims, 4 Drawing Sheets

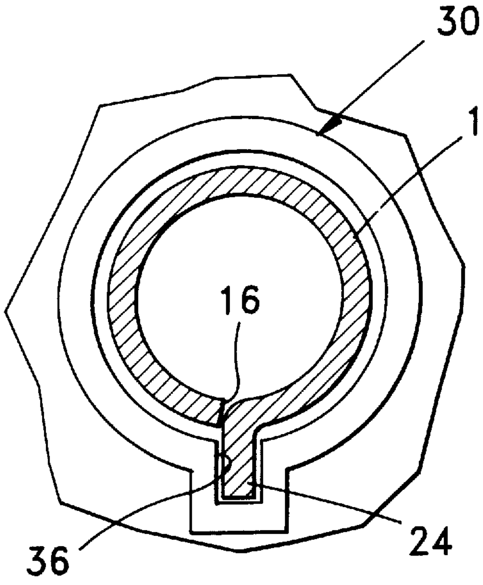
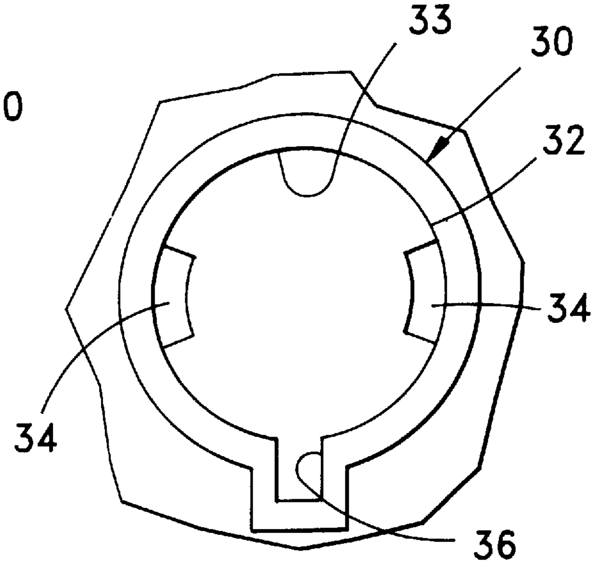
Fig. 3
Fig. 4
Fig. 6
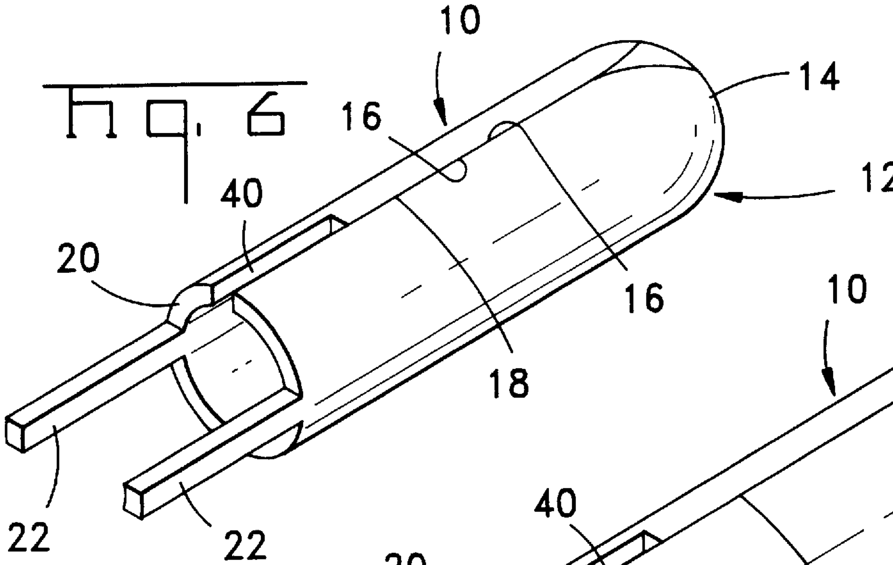
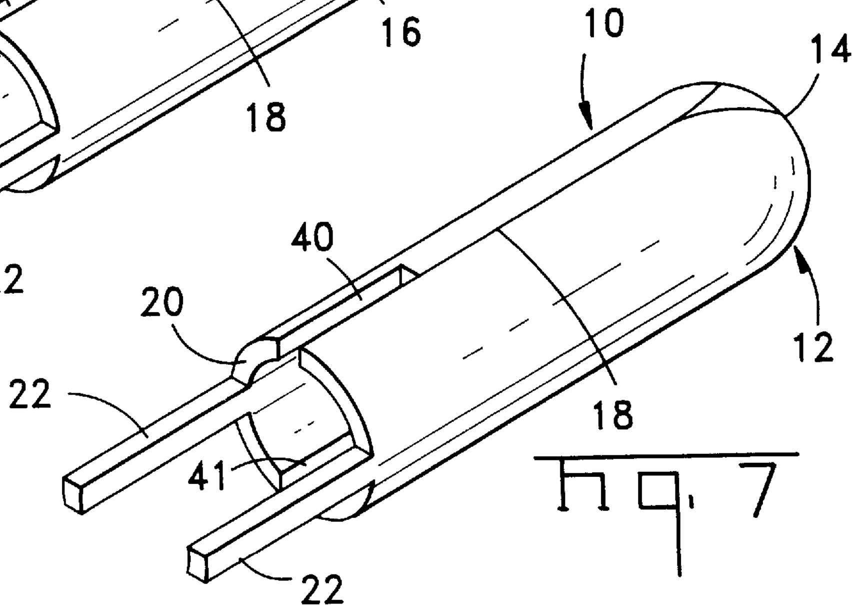
Fig. 7

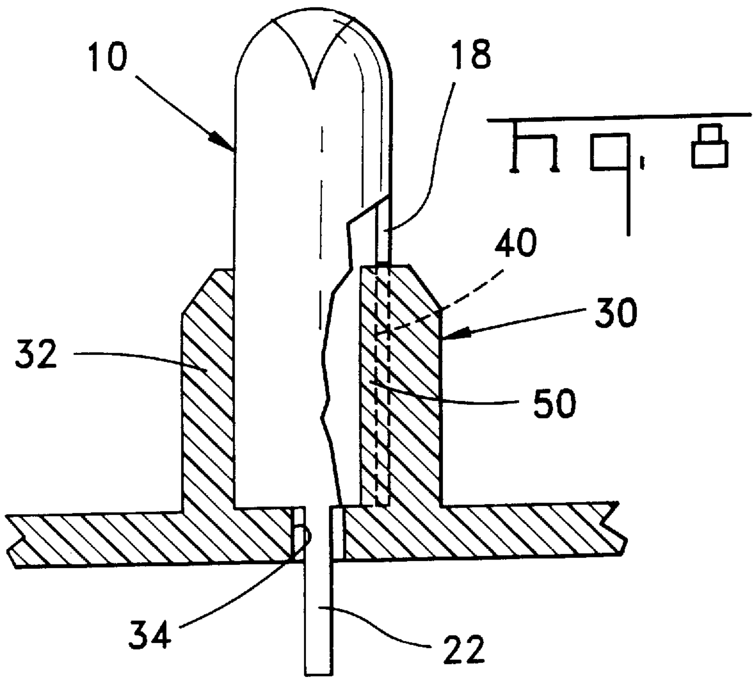
Fig. 8
Fig. 9
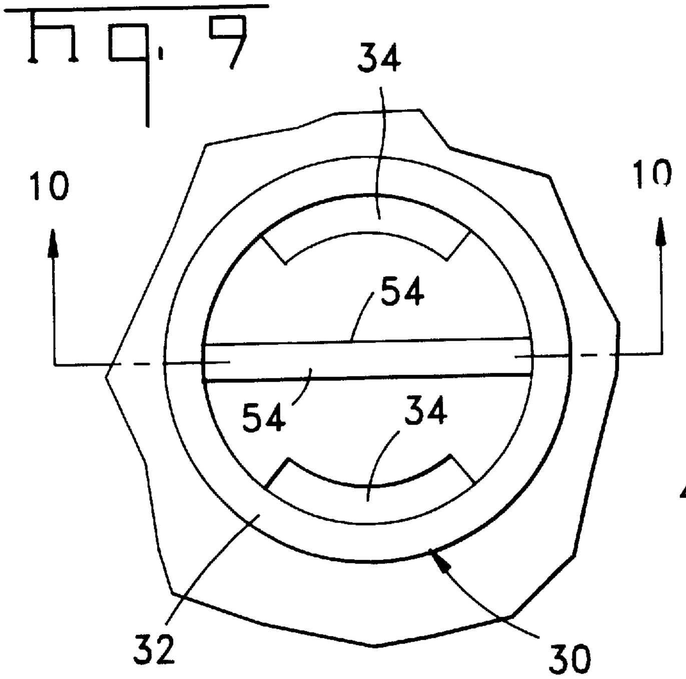
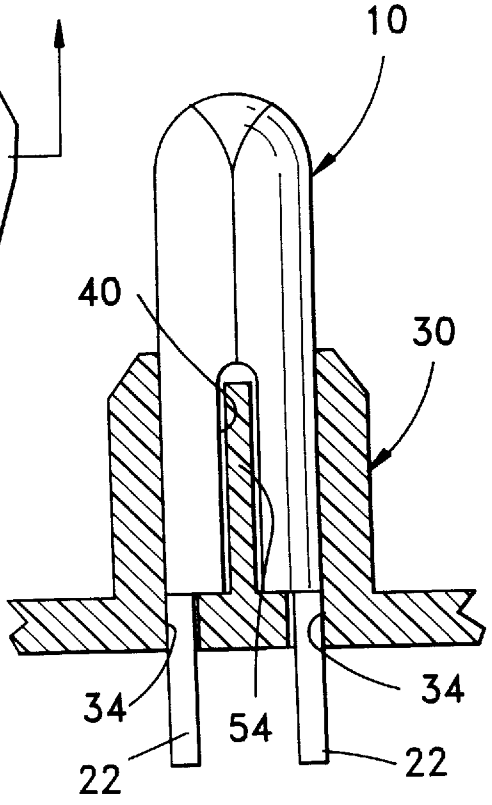
Fig. 10

FORMED ROUND PIN

This application claims the benefit of U.S. Provisional Application(s) No(s). 60/027,035, Filed Sep. 26, 1996.

FIELD OF THE INVENTION

The present invention is directed toward an electrical contact for connecting a circuit board to a receptacle connector.

BACKGROUND OF THE INVENTION

Pin contacts are often used to electrically connect circuitry on a circuit board to a receptacle connector. This connection can provide both signal and power to the circuit board. Pin contacts that are mounted onto the circuit board are typically screw machined contacts having solder tails. Because of the fact that the contacts are screw machined, the solder tails are typically rigid and inflexible. When thermal expansion or stress is applied to the circuit board, the solder joints between the contact and the board are easily broken.

What is needed is a contact which can carry the same amount of current as the screw machined contacts, but is flexible to prevent cracking or breaking of the solder joints.

SUMMARY OF THE INVENTION

The invention comprises a pin contact having a main body with a top contact section, two side edges, and a bottom surface. The two side edges being juxtaposed to form a seam. Solder tails extend from the bottom surface of the main body to be received through holes. An orientation member is formed along the main body and along the seam. The orientation member provides the proper orientation of the main body so that the solder tails are properly aligned with the holes.

BRIEF DESCRIPTION OF THE DRAWINGS

Embodiments of the present invention will now be described by way of example with reference to the accompanying drawings, in which:

FIG. 3 is a top view showing a cross sectional views of the pin contact inserted in the housing;

FIG. 4 is a top view of the housing;

FIG. 6 is a further embodiment of the pin contact;

FIG. 7 is a further embodiment of the pin contact;

FIG. 8 is cross sectional view of the housing with the pin contact shown in FIG. 6 inserted therein;

FIG. 9 is cross sectional view of an alternative embodiment of the housing;

FIG. 10 is a cross sectional view of the housing of FIG. 9 taken along the line 10—10, with the pin contact from FIG. 7 inserted therein.

DETAILED DESCRIPTION OF THE INVENTION

Figure 1:
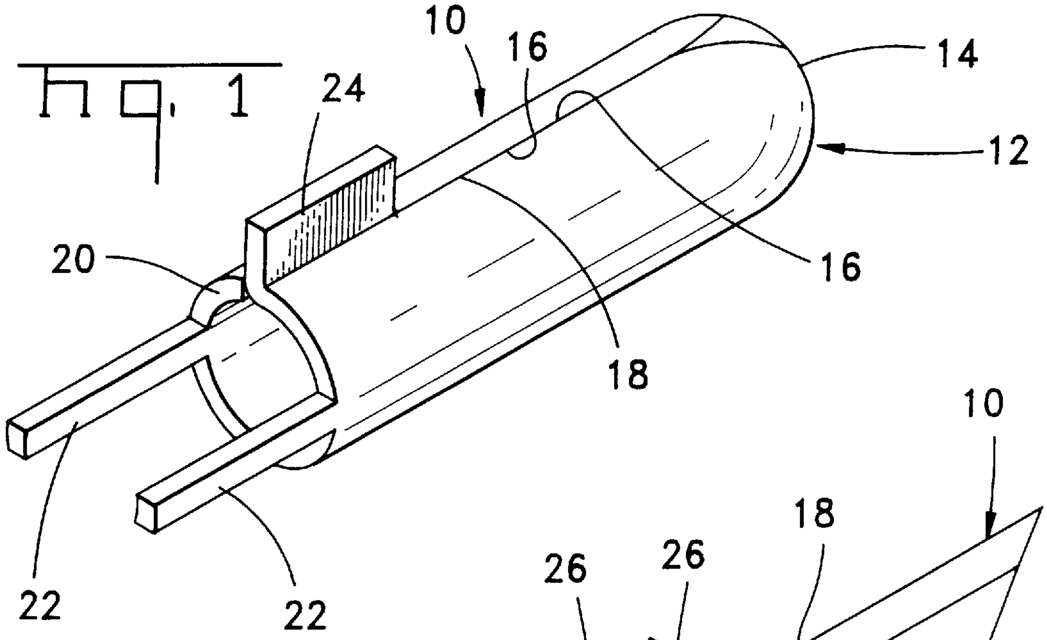
FIG. 1 is a perspective view of the contact pin of the present invention.

FIG. 1 shows the pin contact 10 of the present invention. The pin contact 10 has a main body 12 which is a stamped and formed pin section. The pin contact 10 is a stamped and formed member made from an electrically conductive material such as copper, an alloy thereof, or some other metal having suitable electrical characteristics. The main body 12 has a rounded contact section 14 along the top of the main body 12. The main body has two side edges 16, which, when stamped and formed are juxtaposed towards each other forming a seam 18. The main body 12 has a bottom surface 20 which is essentially flat to be received against the surface of a circuit board or into the bottom of a contact housing as will be described hereinafter. Extending from the bottom surface 20 are solder tails 22 which will be received into through holes in a circuit board to provide electrical connection to the circuit board.

Extending from one of the edges 16 is a orientation member in the form of an orientation tab 24. This tab 24 is used to correctly orient the pin contact 10 with the housing to ensure that the solder tails are received within the through holes on the circuit board.

Figure 2:
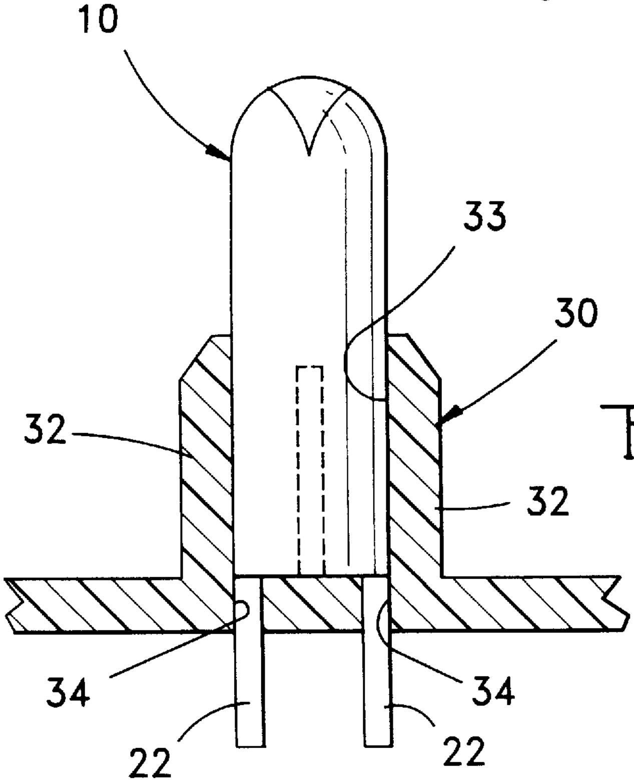
FIG. 2 is a cross sectional view of the contact pin inserted into the housing.

FIG. 2 shows a cross sectional view of the pin contact 10 received within a plastic housing which is formed into a silo 30. The plastic housing is typically formed to be mounted onto a circuit board. The silo 30 has walls 32 which are generally circular to form a cavity 33 for receiving the pin contact 10. The cavity 33 has a flat bottom with two holes 34 along the bottom for receiving the solder tails 22. FIG. 3 shows a top view of the silo 30 with the pin contact inserted therein and shown in cross section. The silo 30 has a key slot 36 for receiving the orientation tab 24 therein. The cooperation of the key slot and the orientation tab ensure that the solder tails are properly aligned with the holes 34 when the pin contact 10 is inserted into the silo 30, as is seen in FIG. 4.

The use of a stamped and formed pin contact has many advantages over the use of a screw machined contact. The solder tails of the stamped and formed contact are more flexible than the solder tail of the screw machined contact. Therefore, if the circuit board flexes due to stress or thermal expansion, the solder connection is less likely to crack or be broken. It is also possible for the solder tails and the whole pin contact to carry as much current as the screw machined contact.

Figure 5:
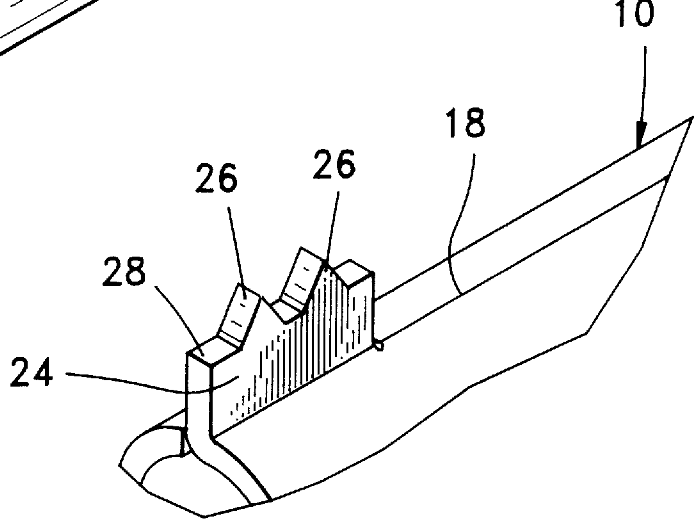
FIG. 5 is an alternative embodiment of the contact pin.

FIG. 5 shows an alternative embodiment of the pin contact. The orientation tab 24 has several barbs 26 extending along its outer edge 28. When the pin contact is inserted into the cavity, the barbs 26 will bite into the plastic housing of the silo 30 thereby securing the pin contact 10 within the cavity 33 of the silo.

FIG. 6 shows an alternative embodiment of the pin contact 10 where the orientation member is in the form of an orientation slot 40 extending along the seam 18. Alternatively, the orientation member can be in the form of two orientation slots 40, 41 extending along either side of the main body 12, as is shown in FIG. 7, one of the slots 40 being formed along the seam 18.

When the contact pin 10 has one orientation slot 40, the silo is designed having a rib 50 extending along the inner wall of the cavity 33. The rib 50 will be received within the slot 40 when the pin contact 10 is inserted into the silo. The cooperation of the orientation slot 40 and the rib 50 ensure that the solder tails 22 are properly aligned with the holes 34 in the bottom of the cavity 33 to allow proper insertion of the solder tails 22.

When the contact pin 10 has two orientation slots 40, 41, the silo 30 is designed having a wall 54 extending across the cavity 33 with the holes 34 along either side of the wall 54.

When the pin contact is inserted into the cavity 33 of the silo 30, the wall 54 will be received within the orientation slots 40, 41. The pin contact 10 will be received within the cavity so that the orientation slots 40, 41, and the pin contact, straddle the wall 54 This alignment ensures that the solder tails 22 are properly aligned with the holes in the bottom of the cavity 33.

Figure 11:
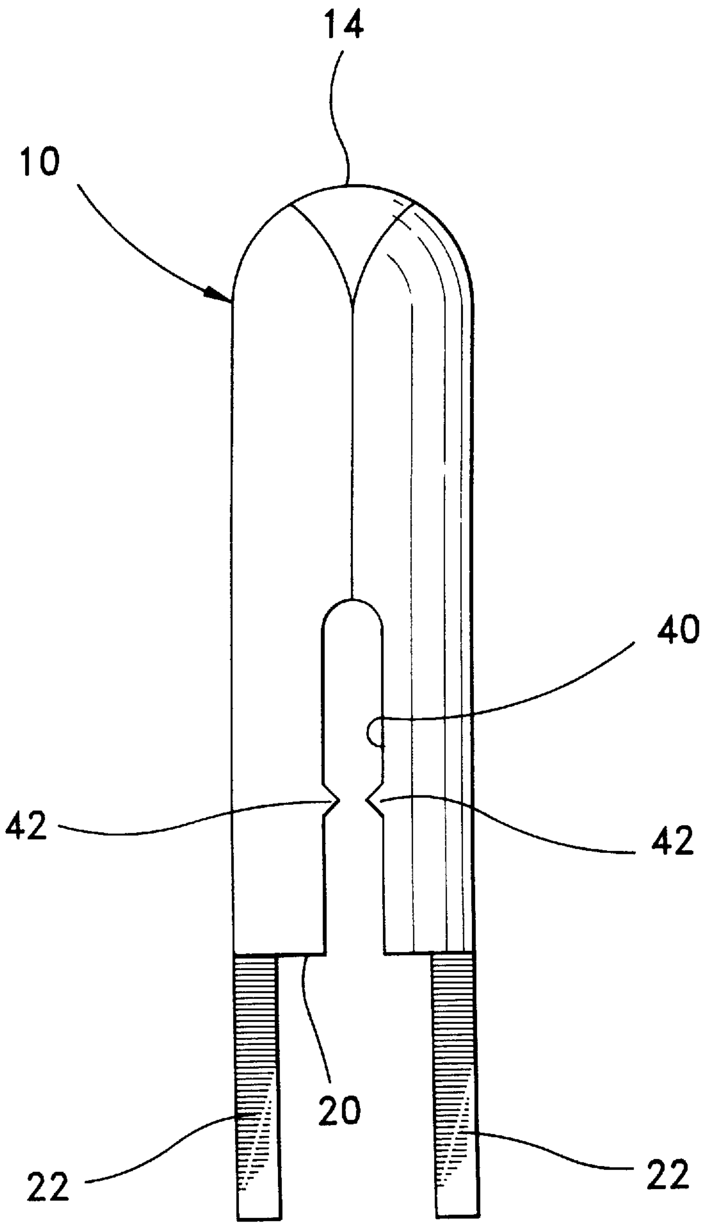
FIG. 11 is a side view of an alternative embodiment of the pin contact.

The orientation slots 40, 41 can be formed with barbs 42, as shown in FIG. 11. When the pin contact is inserted into the cavity, the barbs 42 will bite into the rib 50 or the wall 54 thereby securing the pin contact into the cavity 33.

If greater flexibility is needed between the pin contact and the solder tails, it is possible to form the pin contact having more than two solder tails. For example, the pin contact 10 can be made having 3 or 4 solder tails. These solder tails can be made narrower than the two solder tails, thereby allowing greater flexibility while still allowing the same amount of electrical current to pass through the contact.

The pin contact of the present invention and many of its attendant advantages will be understood from the foregoing description. It is apparent that various changes may be made in the form, construction, and arrangement of parts thereof without departing from the spirit or scope of the invention, or sacrificing all of its material advantages.

What is claimed is:

1. A pin contact, comprising:

a main body having a top contact section defining a rounded section in the shape of a pin contact, two side edges, and a bottom surface, the two side edges being juxtaposed to form a seam;

solder tails extending from the bottom surface of the main body to be received through holes;

an orientation member formed along the main body and along the seam, the orientation member providing the proper orientation to the main body so that the solder tails are properly aligned with the holes.

2. The pin contact of claim 1, wherein the orientation member is a tab extending from one of the side edges.

3. The pin contact of claim 2, wherein the tab has barbs extending from an outer edge of the tab.

4. The pin contact of claim 1, wherein the orientation member is an orientation slot extending between the two side edges along the seam.

5. The pin contact of claim 4, wherein a second orientation slot is disposed along the main body opposite to the orientation slot along the seam.

6. The pin contact of claim 4, wherein the orientation slot has barbs to bite into a housing to secure the contact therein.

* * * * *